US012757894B2

(12) United States Patent
Tanaka

(10) Patent No.: US 12,757,894 B2
(45) **Date of Patent: *Oct. 13, 2026**

(54) AQUEOUS HERBICIDAL COMPOSITIONS AND METHODS OF USE THEREOF

(71) Applicant: Valent U.S.A. LLC, Walnut Creek, CA (US)

(72) Inventor: Takuya Tanaka, Takarazuka (JP)

(73) Assignee: VALENT U.S.A., LLC, San Ramon, CA (US)

( * ) Notice: Subject to any disclaimer, the term of this patent is extended or adjusted under 35 U.S.C. 154(b) by 858 days.

This patent is subject to a terminal disclaimer.

(21) Appl. No.: 17/590,977

(22) Filed: Feb. 2, 2022

(65) Prior Publication Data

US 2022/0151226 A1 May 19, 2022

Related U.S. Application Data

(63) Continuation of application No. 16/227,291, filed on Dec. 20, 2018, now Pat. No. 11,272,705.

(60) Provisional application No. 62/613,111, filed on Jan. 3, 2018.

(51) Int. Cl.

*A01N 25/02* (2006.01)
*A01N 25/10* (2006.01)
*A01N 43/80* (2006.01)
*A01N 43/84* (2006.01)
*A01P 13/00* (2006.01)

(52) U.S. Cl.

CPC ............. *A01N 25/02* (2013.01); *A01N 25/10* (2013.01); *A01N 43/80* (2013.01); *A01N 43/84* (2013.01); *A01P 13/00* (2021.08)

(58) Field of Classification Search

CPC ........ A01N 25/02; A01N 25/10; A01N 43/80; A01N 43/84; A01N 39/04; A01N 25/04; A01N 57/20; A01N 37/40; A01P 13/00

See application file for complete search history.

(56) References Cited

U.S. PATENT DOCUMENTS 11,272,705 B2 * 3/2022 Tanaka .................... A01P 13/00
11,317,624 B2 * 5/2022 Tanaka .................. A01N 25/04
11,317,625 B2 * 5/2022 Zhou ...................... A01N 25/06
11,684,068 B2 * 6/2023 Tanuwidjaja ........ A01N 43/707 504/128
2011/0065579 A1 * 3/2011 Sievernich ............ A01N 43/76 504/128

FOREIGN PATENT DOCUMENTS

WO WO-2017083409 A2 * 5/2017 ............ A01N 25/04

OTHER PUBLICATIONS

Lee, J. et al., Composition used for preventing and controlling grassy weed and broadleaf weed in corn field, comprises diuron and flumioxazin (CN 104396982A), 2015, Derwent Abstract, 5 pages. (Year: 2015).*
Synergy with Organic Gums and Polymers, Veegum/Van Gel: The Products, 2015, RT Vanderbilt, pp. 1-9. (Year: 2015).*
Piper Herbicide Safety Data Sheet, 2015, Valent Professional Product, SDS No. 0439, pp. 1-11. (Year: 2015).*
Fierce Herbicide Booklet Label, 2014, Valent, pp. 1-17. (Year: 2014).*

* cited by examiner

*Primary Examiner* — Sahana S Kaup
*Assistant Examiner* — Andriae M Holt
(74) *Attorney, Agent, or Firm* — Wood, Phillips, Katz, Clark & Mortimer

(57) ABSTRACT

The present invention is directed to an aqueous herbicidal composition containing flumioxazin, pyroxasulfone, hydroxyethyl cellulose, and magnesium aluminum silicate. The present invention is further directed to a method of controlling weeds by applying compositions of the present invention.

9 Claims, No Drawings

AQUEOUS HERBICIDAL COMPOSITIONS AND METHODS OF USE THEREOF

FIELD OF THE INVENTION

The present invention relates to aqueous herbicidal compositions containing flumioxazin, pyroxasulfone, hydroxyethyl cellulose, and magnesium aluminum silicate. The present invention further relates to a method of controlling weeds by applying compositions of the present invention.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, Horseweed (*Conyza Canadensis*) control in no-tillage soybeans (*Glycine max*) with preplant and preemergence herbicides, Weed Technol, 1990, 4, 642-647. Therefore, controlling weeds is a major concern of crop growers. Unwanted plants in crop plant environments include broadleaves, grasses and sedges.

Roundup Powermax® (available from Monsanto Technology LLC) has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Flumioxazin is a protoporphyrinogen oxidase ("PPO") inhibitor herbicide used to control weeds among soybeans, peanuts, orchard fruits and many other agricultural crops in the United States and worldwide. Flumioxazin is effective in controlling glyphosate resistant and tough-to-control weeds.

Pyroxasulfone is relatively new isooxazoline herbicide that inhibits synthesis of very-long-chain fatty acids. Pyroxasulfone is used to control weeds among many agricultural crops including corn and soybean.

As mentioned above, one way to control resistant weeds is to apply multiple herbicides sequentially or concurrently. Often, when multiple herbicides are applied concurrently they are added as suspension concentrates and oil-in-water-emulsions to form a tank mix prior to application. However, when adding multiple herbicide formulations to form a tank mix the user must ensure that the formulations are stable and are mixed properly to ensure compatibly such that precipitation of the active ingredients do not occur. Physical incompatibility among herbicide formulations result in precipitation of one or all of the herbicides or excipients during tank mixing resulting in poor spray characteristics such as clogging spray nozzle and uneven coverage, thus reducing the benefits of the co-application. Despite its popularity, many current water-insoluble herbicide aqueous suspension and emulsion formulations are not physically compatible with Roundup Powermax®.

Accordingly, there is a need in the art for water-insoluble herbicide aqueous suspension and emulsion compositions that are storage stable and compatible with Roundup Powermax®.

SUMMARY OF THE INVENTION

In one embodiment, the present invention is directed to aqueous herbicidal compositions comprising flumioxazin, pyroxasulfone, hydroxyethyl cellulose, and magnesium aluminum silicate.

In another embodiment, the present invention is directed to methods of controlling weeds comprising applying a composition of the present invention to the weeds or an area in need of weed control.

DETAILED DESCRIPTION OF THE INVENTION

Applicant discovered specific thickener combinations that are capable of physically stabilizing water-insoluble herbicide suspension compositions without the occurrence of any gelling and or caking. These compositions are stable over a long duration resulting in long shelf life and ease of use after storage. Further, these compositions are physically compatible with Roundup Powermax® herbicide such that the mixture does not clog the spray nozzle and provides even coverage.

In one embodiment, the present invention is directed to aqueous herbicidal compositions comprising flumioxazin, pyroxasulfone, hydroxyethyl cellulose, and magnesium aluminum silicate.

In another embodiment, the compositions of the present invention do not contain xanthan gum, or methyl celluloses, including methylhydroxypropyl cellulose.

In a preferred embodiment, hydroxyethyl cellulose may be present at a concentration from about 0.010% to about 1.0% w/w and more preferably from about 0.050% to about 0.50% w/w and even more preferably from about 0.10% to about 0.30% w/w, yet more preferably from about 0.10% to about 0.20% w/w and most preferably about 0.10%, 0.15%, or 0.20% w/w.

In another preferred embodiment, magnesium aluminum silicate may be present at a concentration from about 0.10% to about 3.0% w/w and more preferably from about 0.10% to about 1.0% w/w and even more preferably from about 0.50% to about 0.75% w/w and most preferably about 0.50% or about 0.75% w/w.

In another preferred embodiment, the composition of the present invention further comprises water insoluble herbicide.

The term "water insoluble" as used herein means having solubility in deionized water of less than about 10,000 parts per million at 25° C.

Water insoluble herbicides suitable for use in the present invention include, but are not limited to: aryloxyphenoxypropionate compounds such as cyhalofop-butyl, fluazifop-P-butyl, and quizalofop-P-ethyl; cyclohexanedione compounds such as sethoxydim, tepraloxydim, and clethodim; sulfonylurea compounds such as bensulfuron-methyl, imazosulfuron, sulfosulfuron, ethametsulfuron-methyl, halosulfuron-methyl, flazasulfuron, nicosulfuron, rimsulfuron, and chlorimuron-ethyl; imidazolinone compounds such as imazethapyr; triazolopyrimidine compounds such as penoxsulam, and florasulam; dinitroaniline compounds such as trifluralin, pendimethalin, and oryzalin; phenoxy-carboxylic-acid compounds such as dichlorprop, methylchlorophenoxypropionic acid ("MCPP"), 4-(4-chloro-2-methylphenoxy)butanoic acid ("MCPB"), and triclopyr; triazine compounds such as simazine, atrazine, prometryn, and cyanazine; triazinone compounds such as metribuzin; uracil compounds such as lenacil, terbacil, and bromacil; phenylcarbamate compounds such as phenmedipham, and desmedipham; nitrile compounds such as ioxynil, and dichlobenil; benzothiadiazinone compounds such as bentazon; urea compounds such as diuron, linuron, siduron, isouron, and tebuthiuron; thiocarbamate compounds such as thiobencarb, and molinate; pyridinecarboxamide compounds such as diflufenican; diphenylether compounds such as bifenox, chlomethoxyfen, fluoroglycofen-ethyl, fomesafen, halosafen, lactofen, and oxyfluorfen; phenylpyrazole compounds such as fluazolate, and pyraflufen-ethyl; N-phenylphthalimide compounds such as cinidon-ethyl, and flumiclorac-pentyl; thiadiazole compounds such as fluthiacet-methyl, and thidiazimin; oxadiazole compounds such as oxadiazon, and oxadiargyl; triazolinone compounds such as azafenidin, carfentrazone-ethyl, and sulfentrazone; oxazolidinedione compounds such as pentoxazone; pyrimidindione compounds such as benzfendizone, and butafenacil; chloroacetamide compounds such as alachlor, butachlor, and metolachlor; acetamide compounds such as napropamide.

In a yet more preferred embodiment, flumioxazin is at a concentration from about from about 0.10% to about 50% w/w, more preferably from about 1.0% to about 50% w/w, even more preferably from about 4.0% to about 22% w/w and most preferably about 14% w/w.

In a yet more preferred embodiment, pyroxasulfone is at a concentration from about from about 0.10% to about 50% w/w, more preferably from about 1.0% to about 50% w/w, even more preferably from about 5.0% to about 28% w/w and most preferably about 18% w/w.

Compositions of the present invention may further comprise one or more excipients selected from the group consisting of a dispersant, an antifoaming agent, an antifreeze agent, a preservative and a chelating agent.

Dispersants suitable for use in the present invention include, but are not limited to, acrylic graft copolymers and alkylphenol ethoxylate free nonionic wetters.

In another preferred embodiment, the 35% acrylic graft copolymer may be present at a concentration from about 0.10% to about 10% w/w, even more preferably from about 1.0% to about 5.0% w/w and most preferably about 4.0% w/w.

In another preferred embodiment, the acrylic graft copolymer has a density of 1.07 g/mL at 25° C., a flash point of greater than 100° C., a pour point of less than 0° C. and a viscosity of 200 mPa·s at 25° C.

In another preferred embodiment, the alkylphenol ethoxylate free nonionic wetter may be present at a concentration from about 0.1% to about 10% w/w, even more preferably from about 1.0% to about 5.0% w/w and most preferably about 2.0% w/w.

In another preferred embodiment, the alkylphenol ethoxylate free nonionic wetter has a density of 1.0 g/mL at 25° C., a flash point of greater than 100° C., a pour point of 7° C. and a viscosity of 800 mPa·s at 25° C.

Antifoaming agents suitable for use in the present invention include, but are not limited to, silicone antifoaming agents including silicone emulsions, silicone compounds, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols and mixtures thereof. In a preferred embodiment, the antifoaming agent is a silicone compound. Antifoaming agents may be present at a concentration from about 0.010% to about 1.0% w/w, preferably from about 0.050% to about 0.50% w/w and more preferably about 0.20% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerol, pentaerythritol, 1,4-cyclohexanedimethanol, xylenol, and bisphenols such as bisphenol A. In a preferred embodiment, the antifreeze agent is propylene glycol. Antifreeze agents may be present at a concentration from about 1.0% to about 10% w/w, preferably from about 2.0% to about 9.0% w/w, more preferably from about 3.0% to about 8.0% w/w and most preferably about 5.0% w/w.

Preservatives suitable for use in the present invention include, but are not limited to, a 5-chloro-2-methyl-4-isothiazolin-3-one and 2-methyl-4-isothiazolin-3-one solution in water, such as Kathon® CG/ICP (available from Rohm and Haas Company) and Legend MK® (available from Rohm and Haas Company), 1,2-benzisothiazolin-3-one and a mixture of 1,2-benzisothiazolin-3-one and 6.5% 2-bromo-2-nitro-1,3-propanediol. In a preferred embodiment the preservative is 1,2-benzisothiazolin-3-one. Preservatives may be present at a concentration from about 0.010% to about 1.0% w/w, preferably from about 0.010% to about 0.50% w/w, and more preferably about 0.20% w/w.

Chelating agents suitable for use in the present invention include, but are not limited to, ethylenediaminetetraacetic acid ("EDTA"), EDTA salts, such as tetrasodium ethylenediaminetetraacetate tetrahydrate, citrates and gluconates. In a preferred embodiment, the chelating agent is tetrasodium ethylenediaminetetraacetate tetrahydrate. Chelating agents may be present at a concentration from about 0.010% to about 2% w/w, preferably from about 0.10% to about 1.0% w/w and most preferably about 0.15% w/w.

In a preferred embodiment, the present invention is directed to an aqueous herbicidal suspension composition comprising:

about 14% w/w flumioxazin;
about 18% w/w pyroxasulfone;
about 4% w/w of an acrylic graft copolymer;
about 2% w/w of an alkylphenol ethoxylate free nonionic wetter;
about 0.2% w/w of a silicone compound;
about 0.2% w/w of 1,2-benzisothiazolin-3-one;
about 5% w/w propylene glycol;
from about 0.10% to about 0.20% w/w hydroxyethyl cellulose; and
from about 0.5% to about 0.75% w/w magnesium aluminum silicate.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

TABLE 1

Composition of the Invention

| Composition | 1 |
|---|---|
| Flumioxazin | 14.0% |
| Pyroxasulfone | 17.8% |
| Acrylic graft copolymer (35%) | 4.0% |
| Alkylphenol ethoxylate free nonionic wetter | 2.0% |
| Silicone compound | 0.2% |
| 1,2-benzisothiazolin-3-one | 0.2% |
| Propylene glycol | 5.0% |
| Tetrasodium ethylenediaminetetraacetate tetrahydrate | 0%-1.5% |
| Thickener System | 0.15%-0.65% |
| Water | Q.S. |

Atlox® 4913 is used as the source of 35% acrylic graft copolymer and is available from Croda Americas LLC.

Atlox® 4894 is used as the source of alkylphenol ethoxylate free nonionic wetter and is available from Croda Americas LLC.

Xiameter® ACP-1500 is used as the source of silicone compound and is available from Dow Corning Corporation.

Proxel® GXL is used as the source of 1,2-benzisothiazolin-3-one and is available from Arch Chemicals, Inc.

Versene® 220 crystal is used as the source of tetrasodium ethylenediaminetetraacetate tetrahydrate and is available from Dow Chemical Company.

Example 1—Process for Preparation of Compositions of the Invention

Process 1

Hydroxyethyl cellulose was dissolved in alkali water to create a hydroxyethyl cellulose solution. Magnesium aluminum silicate was dispersed in water under high-shear agitation to create an inorganic thickener dispersion. Excipients including a dispersant, an antifoaming agent, an antifreeze agent, a preservative and a chelating agent were dissolved or dispersed in water under continuous agitation until the composition was homogenous. Once homogenous, pyroxasulfone and flumioxazin was added to the composition. After mixing under high-shear agitation, the composition was wet milled to a median particle size of about 2 micrometers ("μM") using zirconia beads to create a mill base. The hydroxyethyl cellulose solution and the inorganic thickener dispersion were then sequentially added to the mill base.

Process 2

Hydroxyethyl cellulose was dissolved in alkali water to create a hydroxyethyl cellulose solution. Magnesium aluminum silicate and additional excipients including a dispersant, an antifoaming agent, an antifreeze agent, a preservative and a chelating agent were dissolved or dispersed in water under continuous agitation until the composition was homogenous. Once homogenous, pyroxasulfone and flumioxazin was added to the composition. After mixing under high-shear agitation, the composition was wet milled to a median particle size of about 2 μM using zirconia beads to create a mill base. The hydroxyethyl cellulose solution was then added to the mill base.

Example 2—Compatibility of Various Thickener Systems of Composition 1 with Roundup Powermax®

Method

Composition 1, from Table 1 above, was formulated with various thickener systems and then analyzed for rheological properties, subjected to 2 weeks at 54° C., to determine long-term storage stability. Compositions 1A-1D were also tested for physical compatibility with Roundup Powermax®. The physical compatibility test was carried out as follows: 96.1 milliliters ("mL") of water and 3.4 mL of Roundup Powermax® were charged and mixed in a 100-mL graduated cylinder. 0.5 mL of the composition of the present invention was charged therein, mixed by inverting the cylinder 30 times and then left at room temperature for 24 hours. After 24 hours, the dispersion was re-mixed by inverting the cylinder 30 times and passed through a 150 μM-sieve. Compatibility was evaluated by observing if any aggregations were observed (incompatible) or not (compatible) on the sieve. Results from these analyses can be seen in Table 2, below.

TABLE 2

Various Thickener Systems for Composition 1

| Composition | 1A | 1B | 1C | 1D |
|---|---|---|---|---|
| Xanthan gum | — | — | 0.15% | — |
| Hydroxyethyl cellulose | 0.15% | 0.15% | — | 0.15% |

TABLE 2-continued

| Various Thickener Systems for Composition 1 | | | | |
|---|---|---|---|---|
| Composition | 1A | 1B | 1C | 1D |
| Magnesium aluminum silicate | 0.5% | 0.5% | 0.5% | — |
| Tetrasodium ethylenediaminetetraacetate tetrahydrate | — | 0.15% | 1.5% | 0.15% |
| Roundup Powermax ® Compatibility | Yes | Yes | No | Yes |
| Storage at 54° C. (2 weeks) | Flow | Flow | — | Flow |
| Inversion Test after storage at 54° C. | <10 | <10 | — | >50 |

Kelzan® BT is used as the source of xanthan gum and is available from CP Kelco.

Cellosize® QP 100MH is used as the source of hydroxyethyl cellulose and is available from Dow Chemical Company.

Veegum® R (CAS #1302-78-9) is used as the source of magnesium aluminum silicate and is available from Vanderbilt Minerals, LLC.

Results

Composition 1C, which contains xanthan gum, was found to be incompatible with Roundup Powermax®. Specifically, Composition 1C formed white fibrous aggregations immediately after adding to the Roundup Powermax® solution. The white fibrous aggregations were not dispersed completely even after 30 times inversion and did not pass through the 150 μM-sieve. Unexpectedly, all other thickener systems containing hydroxyethyl cellulose and magnesium aluminum silicate were compatible with Roundup Powermax®. Specifically, Compositions 1A, 1B and 1D dispersed into the Roundup Powermax® aqueous solution and did not form any residues on the sieve.

Further, Composition 1A, 1B and 1D were flowable after storage for 2 weeks at 54° C. demonstrating good storage stability. However, Composition 1D took over 50 inversions to completely reconstitute after storage for 2 weeks at 54° C. Thus, compositions of the present invention that a contain combination of hydroxyethyl cellulose and magnesium aluminum silicate enables both good storage stability and compatibility with Roundup Powermax®.

Example 3—Compatibility of Further Compositions of the Invention with Roundup Powermax®

Method

Compositions 2A-2E, from Table 3, below, were subjected to 2 weeks at 54° C., to determine long-term storage stability and physical compatibility with Roundup Powermax®. The physical compatibility test was carried out as follows: 96.1 milliliters ("mL") of water and 3.4 mL of Roundup Powermax® were charged and mixed in a 100-mL graduated cylinder. 0.5 mL of the composition of the present invention was charged therein, mixed by inverting the cylinder 30 times and then left at room temperature for 24 hours. After 24 hours, the dispersion was re-mixed by inverting the cylinder 30 times and passed through a 150 μM-sieve. Compatibility was evaluated by observing if any aggregations were observed (incompatible) or not (compatible) on the sieve. Results from these analyses can be seen in Table 3, below.

TABLE 3

| Various Compositions and Storage and Compatibility Results | | | | | |
|---|---|---|---|---|---|
| Composition | 2A | 2B | 2C | 2D | 2E |
| Flumioxazin | 14.0% | 14.0% | 14.0% | 14.0% | 14.0% |
| Pyroxasulfone | 17.8% | 17.8% | 17.8% | 17.8% | 17.8% |
| Acrylic graft copolymer (35%) | 4.0% | 4.0% | 4.0% | 4.0% | 4.0% |
| Alkylphenol ethoxylate free nonionic wetter | 2.0% | 2.0% | 2.0% | 2.0% | 2.0% |
| Silicone compound | 0.2% | 0.2% | 0.2% | 0.2% | 0.2% |
| Hydroxyethyl cellulose | 0.1% | 0.2% | 0.1% | 0.15% | 0.2% |
| Magnesium aluminum silicate | 0.5% | 0.5% | 0.75% | 0.75% | 0.75% |
| 1,2-benzisothiazolin-3-one | 0.2% | 0.2% | 0.2% | 0.2% | 0.2% |
| Propylene glycol | 5.0% | 5.0% | 5.0% | 5.0% | 5.0% |
| Water | Q.S. | Q.S. | Q.S. | Q.S. | Q.S. |
| Roundup Powermax ® compatibility | YES | YES | YES | YES | YES |
| Storage at 54° C. (2 weeks) | Flow | Flow | Flow | Flow | Flow |
| Inversion Test after storage at 54° C. | <10 | <10 | <10 | <10 | <10 |

Atlox® 4913 is used as the source of 35% acrylic graft copolymer and is available from Croda Americas LLC.

Atlox® 4894 is used as the source of alkylphenol ethoxylate free nonionic wetter and is available from Croda Americas LLC.

Xiameter® ACP-1500 is used as the source of silicone compound and is available from Dow Corning Corporation.

Proxel® GXL is used as the source of 1,2-benzisothiazolin-3-one and is available from Arch Chemicals, Inc.

Cellosize® QP 100MH is used as the source of hydroxyethyl cellulose and is available from Dow Chemical Company.

Veegum® R (CAS #1302-78-9) is used as the source of magnesium aluminum silicate and is available from Vanderbilt Minerals, LLC.

Results

Compositions 2A-2E, which contain hydroxyethyl cellulose and magnesium aluminum silicate, were compatible with Roundup Powermax®. Specifically, Compositions 2A-2E dispersed into the Roundup Powermax® aqueous solution and did not form any residues on the sieve.

Further, Compositions 2A-2E were flowable after storage for 2 weeks at 54° C. demonstrating good storage stability. Thus, compositions of the present invention that a contain combination of hydroxyethyl cellulose and magnesium aluminum silicate enables both good storage stability and compatibility with Roundup Powermax®.

What is claimed is:

1. An aqueous herbicidal composition comprising:
from about 4% to about 22% w/w flumioxazin;
from about 5% to about 28% w/w pyroxasulfone;
hydroxyethyl cellulose; and
magnesium aluminum silicate,
wherein the concentration ratio of magnesium aluminum silicate to hydroxyethyl cellulose is from about 7.5:1 to about 2.5:1.

2. The composition of claim 1, wherein hydroxyethyl cellulose is at a concentration from about 0.010% to about 1.0% w/w, wherein w/w denotes weight by total weight of the formulation.

3. The composition of claim 1, wherein magnesium aluminum silicate is at a concentration from about 0.10% to about 3.0% w/w, wherein w/w denotes weight by total weight of the formulation.

4. The composition of claim 1, wherein flumioxazin is present at a concentration of about 14% w/w, wherein w/w denotes weight by total weight of the formulation.

5. The composition of claim 1, wherein pyroxasulfone is at a concentration of about 18% w/w, wherein w/w denotes weight by total weight of the formulation.

6. The composition of claim 1, further comprising one or more excipients selected from the group consisting of a dispersant, an antifoaming agent, an antifreeze, a preservative and a chelating agent.

7. The composition of claim 6, wherein the one or more excipients are an acrylic graft copolymer, an alkylphenol ethoxylate free nonionic wetter, a silicone compound, propylene glycol and 1,2-benzisothiazolin-3-one.

8. A method of controlling a weed comprising applying the composition of claim 1 to the weed or an area in need of weed control.

9. The method of claim 8, wherein the composition of claim 1 is applied sequentially or concurrently with a compound selected from the group consisting of glyphosate, glufosinate, dicamba, 2,4-D and mixtures thereof.

* * * * *